United States Patent
Lee

(10) Patent No.: US 6,332,532 B1
(45) Date of Patent: Dec. 25, 2001

(54) EYEGLASSES MAINTENANCE KIT

(75) Inventor: Ching-Chang Lee, Taipei (TW)

(73) Assignee: Brothers Promotions Inc. (TW)

( * ) Notice: Subject to any disclaimer, the term of this patent is extended or adjusted under 35 U.S.C. 154(b) by 0 days.

(21) Appl. No.: 09/629,147

(22) Filed: Jul. 31, 2000

(51) Int. Cl.[7] .............. B65D 69/00; B25F 1/02; B25G 1/08
(52) U.S. Cl. ............... 206/234; 7/127; 7/165; 81/436; 81/490; 81/177.4; 206/38
(58) Field of Search ............... 206/234, 223, 206/37, 38; 7/129, 127, 165, 168; 81/439, 437, 440, 436, 451, 452, 490, 177 A, 177.6

(56) References Cited

U.S. PATENT DOCUMENTS

| | | | |
|---|---|---|---|
| 4,815,346 | * | 3/1989 | Littlehorn ........................ 81/177.4 |
| 5,613,413 | * | 3/1997 | Huang ............................. 81/490 |
| 5,669,492 | * | 9/1997 | Chao ............................. 206/234 |
| 6,033,163 | * | 3/2000 | Anderson ........................ 206/234 |
| 6,109,148 | * | 8/2000 | Anderson et al. ................ 81/440 |
| 6,145,655 | * | 11/2000 | Tsai ............................... 206/38 |
| 6,260,453 | * | 7/2001 | Anderson et al. ................ 81/440 |

\* cited by examiner

*Primary Examiner*—Bryon P. Gehman
(74) *Attorney, Agent, or Firm*—Lowe Hauptman Gilman & Berner, LLP

(57) ABSTRACT

An eyeglasses maintenance kit includes a hollow casing body, a pincer, and a screw driving tool bit. The casing body has an open top end and a bottom end opposite to the top end, and includes upright front and rear walls and opposite lateral walls that interconnect the front and rear walls. The bottom end of the casing body is formed with a bit engaging member. The pincer is mounted removably in the casing body via the open top end of the casing body, and includes a pair of resilient clamping arms with upper and lower end portions, and a bridging portion that interconnects the upper end portions of the clamping arms. The tool bit is mounted to the bit engaging member.

19 Claims, 7 Drawing Sheets

EYEGLASSES MAINTENANCE KIT

BACKGROUND OF THE INVENTION

1. Field of the Invention

The invention relates to an eyeglasses maintenance kit, more particularly to an eyeglasses maintenance kit that is convenient to carry, and that facilitates maintenance and cleaning of eyeglasses.

2. Description of the Related Art

In the outdoors, it is difficult to find a lens wiping cloth to clean dirty eyeglasses lenses. Likewise, it is hard to find a small screw driver to tighten loosened screws in an eyeglasses frame.

SUMMARY OF THE INVENTION

Therefore, the object of the present invention is to provide an eyeglasses maintenance kit that is convenient to carry, and that facilitates maintenance and cleaning of eyeglasses.

According to the present invention, an eyeglasses maintenance kit includes a hollow casing body, a pincer, and a screw driving tool bit.

The casing body has an open top end and a bottom end opposite to the top end, and includes upright front and rear walls and opposite lateral walls that interconnect the front and rear walls. The bottom end of the casing body is formed with a bit engaging member.

The pincer is mounted removably in the casing body via the open top end of the casing body, and includes a pair of resilient clamping arms with upper and lower end portions, and a bridging portion that interconnects the upper end portions of the clamping arms.

The tool bit is mounted to the bit engaging member.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
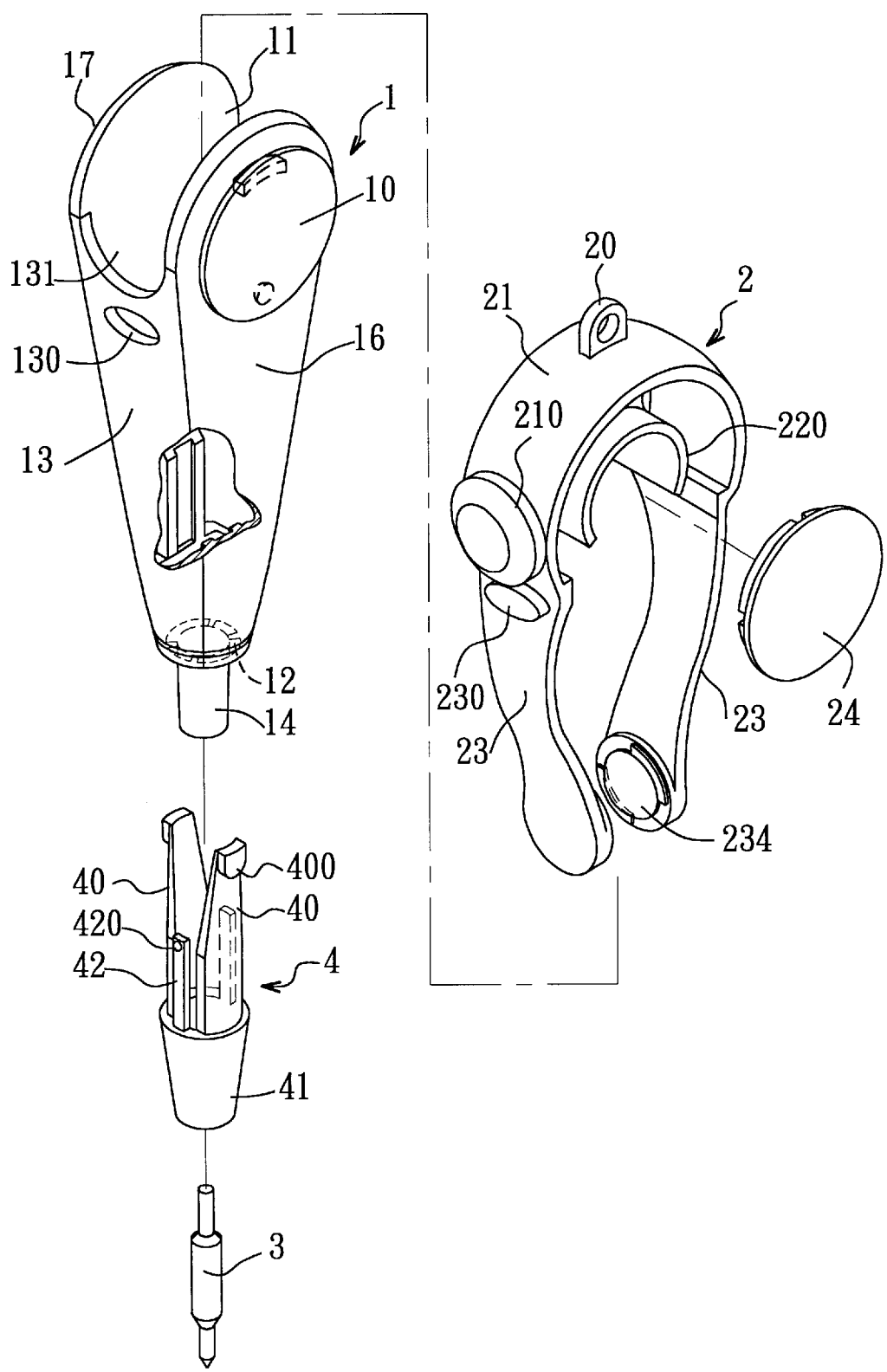
FIG. 1 is an exploded perspective partly cutaway view showing the first preferred embodiment of an eyeglasses maintenance kit according to this invention.

Before the present invention is described in greater detail, it should be noted that like elements are denoted by the same reference numerals throughout the disclosure.

Figure 2:
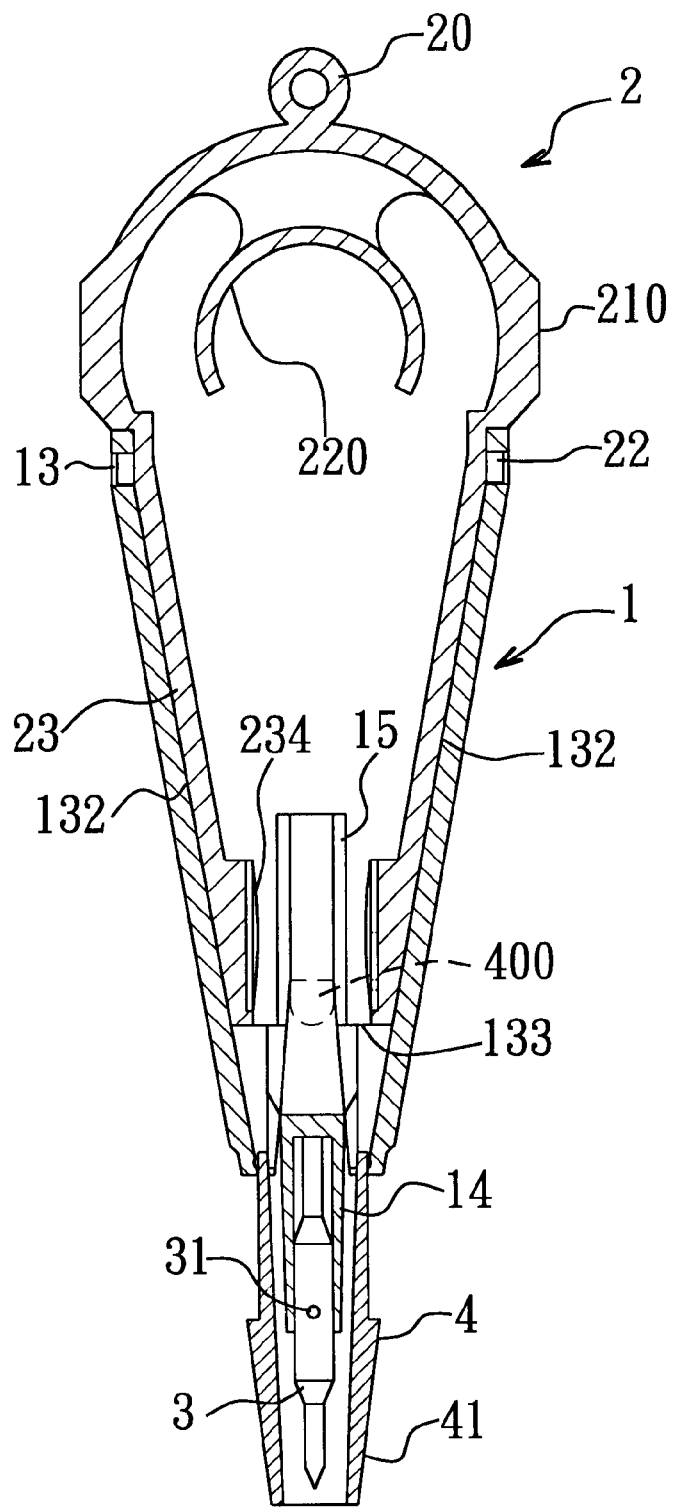
FIG. 2 is a sectional schematic view of the first preferred embodiment.

Referring to FIGS. 1 and 2, according to the first preferred embodiment of this invention, an eyeglasses maintenance kit is shown to include a hollow casing body 1, a pincer 2, a screw driving tool bit 3, and a cover member 4.

Figure 3:
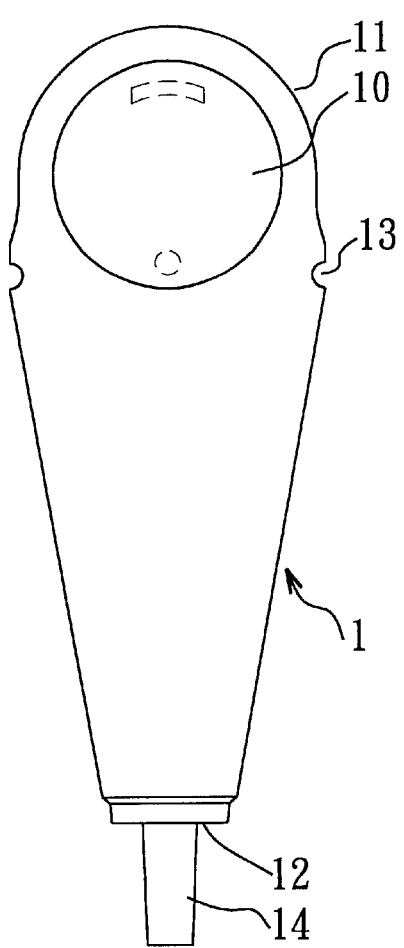
FIG. 3 is a schematic front view of a casing body of the first preferred embodiment.
Figure 4:
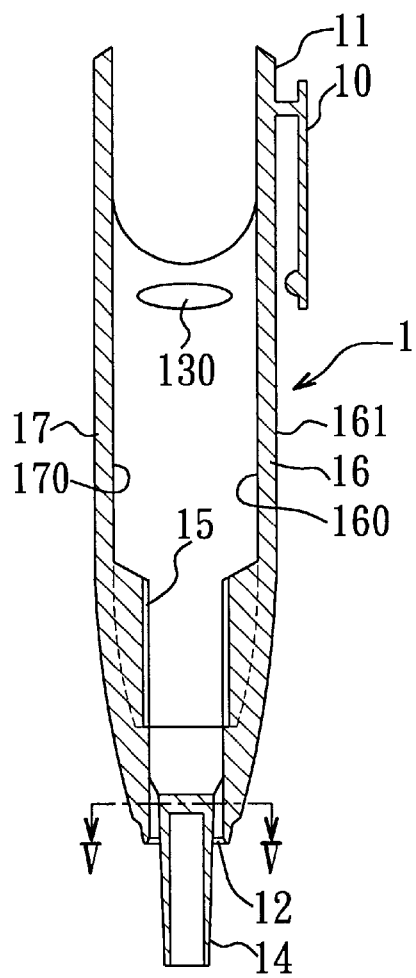
FIG. 4 is a sectional schematic of the casing body of the first preferred embodiment.
Figure 5:
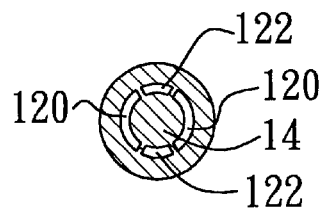
FIG. 5 is a sectional schematic view of FIG. 4 taken along line V—V.
Figure 6:
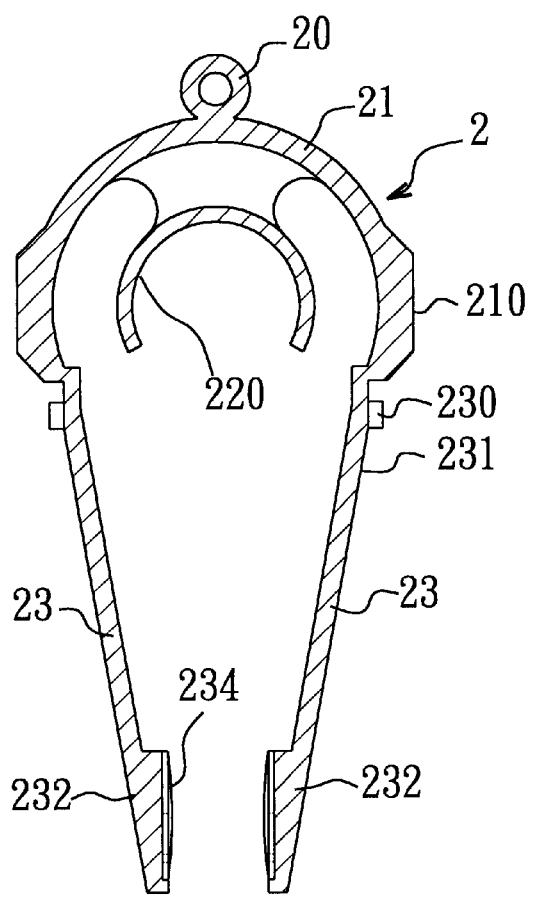
FIG. 6 is a sectional schematic view of a pincer of the first preferred embodiment.
Figure 7:
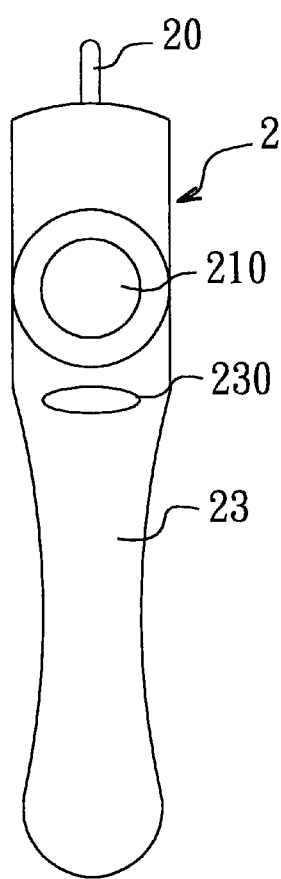
FIG. 7 is a schematic side view of the pincer of the first preferred embodiment.

As shown in FIGS. 1, 3 and 4, the casing body 1 has an open top end 11 and a bottom end 12 opposite to the top end 11, and includes upright front and rear walls 16, 17 and opposite lateral walls 13 that interconnect the front and rear walls 16, 17. The bottom end 12 of the casing body 1 is formed with a bit engaging member 14 that is formed as a tubular member. Each of the lateral walls 13 of the casing body 1 is formed with a notch 131 that extends to the open top end 11 of the casing body 1. The bit engaging member 14 extends into the casing body 1, and cooperates with the front, rear and lateral walls 16, 17, 13 to form a pair of opposing slide grooves 120 and a pair of opposing retaining grooves 122, as shown in FIG. 5. The casing body 1 has opposite inner wall surfaces 160, 170 formed with a pair of confronting vertical keyways 15. The casing body 1 further has opposite inner wall surfaces 132 formed with a pair of confronting radial inward shoulders 133, as shown in FIG. 1. The casing body 1 further has a clip 10 formed on a front outer wall surface 161 thereof. The clip 10 is adapted to be clipped on a belt or a pocket so as to facilitate carrying.

The pincer 2 is mounted removably in the casing body 1 via the open top end 11 of the casing body 1, and includes a pair of resilient clamping arms 23 with upper and lower end portions 231, 232, and a bridging portion 21 that interconnects the upper end portions 231 of the clamping arms 23. The bridging portion 21 of the pincer 2 is provided with a pair of grip projections 210 that are seated respectively in the notches 131 of the casing body 1 when the pincer 2 is mounted in the casing body 1. The pair of clamping arms 23 is formed with a pair of positioning projections 230. The casing body 1 is formed with a pair of positioning holes for engaging removably the positioning projections 230 when the pincer 2 is mounted in the casing body 1. The bridging portion 21 extends outwardly of the open top end 11 of the casing body 1 when the pincer 2 is mounted in said casing body 1, and is formed with an eyelet 20 adapted to be connected to a key ring (not shown) to facilitate carrying. The clamping arms 23 are in sliding contact with the inner wall surfaces 132 of the casing body 1 when the pincer 2 is mounted in the casing body 1. In addition, the bridging portion 21 is formed with a cloth retaining member 220 that extends between the clamping arms 23, and that is adapted to retain removably a lens wiping cloth (not shown) between the clamping arms 23. The lower end portion 232 of each of the clamping arms 23 has a lens rubbing pad 234 mounted thereon. The pincer 2 further includes a cover plate 24 that is mounted on one side of the cloth retaining member 220. When a user presses the grip projections 210 of the bridging portion 21 of the pincer 2 inwardly, the pincer 2 can be pulled outwardly from the casing body 1 to expose the lens rubbing pads 234.

Figure 8:
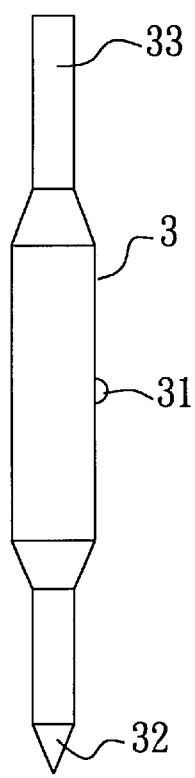
FIG. 8 is a schematic view of a screw driving tool bit of the first preferred embodiment.
Figure 9:
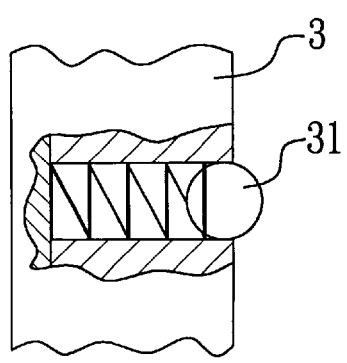
FIG. 9 is a fragmentary partly sectional schematic of the tool bit of the first preferred embodiment.

As shown in FIGS. 8 and 9, the tool bit 3 is mounted removably in the bit engaging member 14, and has an axial length longer than that of the bit engaging member 14. The tool bit 3 is provided with a spring-loaded retainer 31 for retaining removably the tool bit 3 in the bit engaging bit 14. The tool bit 3 has a first end portion 32 formed as a flat tip, and a second end portion 23 formed as a cross-tip.

Figure 10:
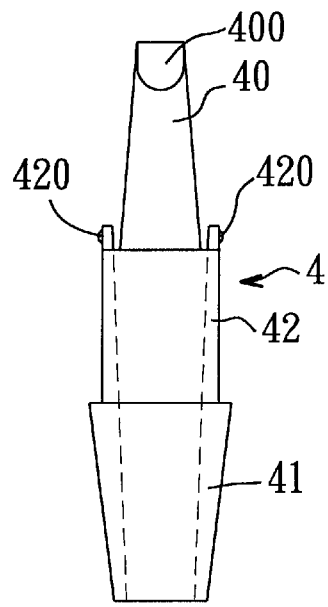
FIG. 10 is a schematic front view of a cover member of the first preferred embodiment.
Figure 11:
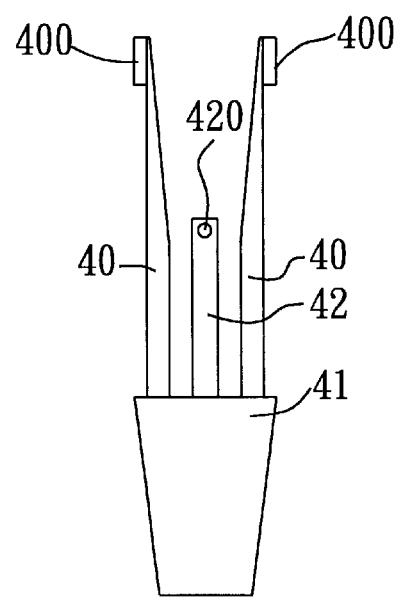
FIG. 11 is a schematic side view of the cover member of the first preferred embodiment.
Figure 12:
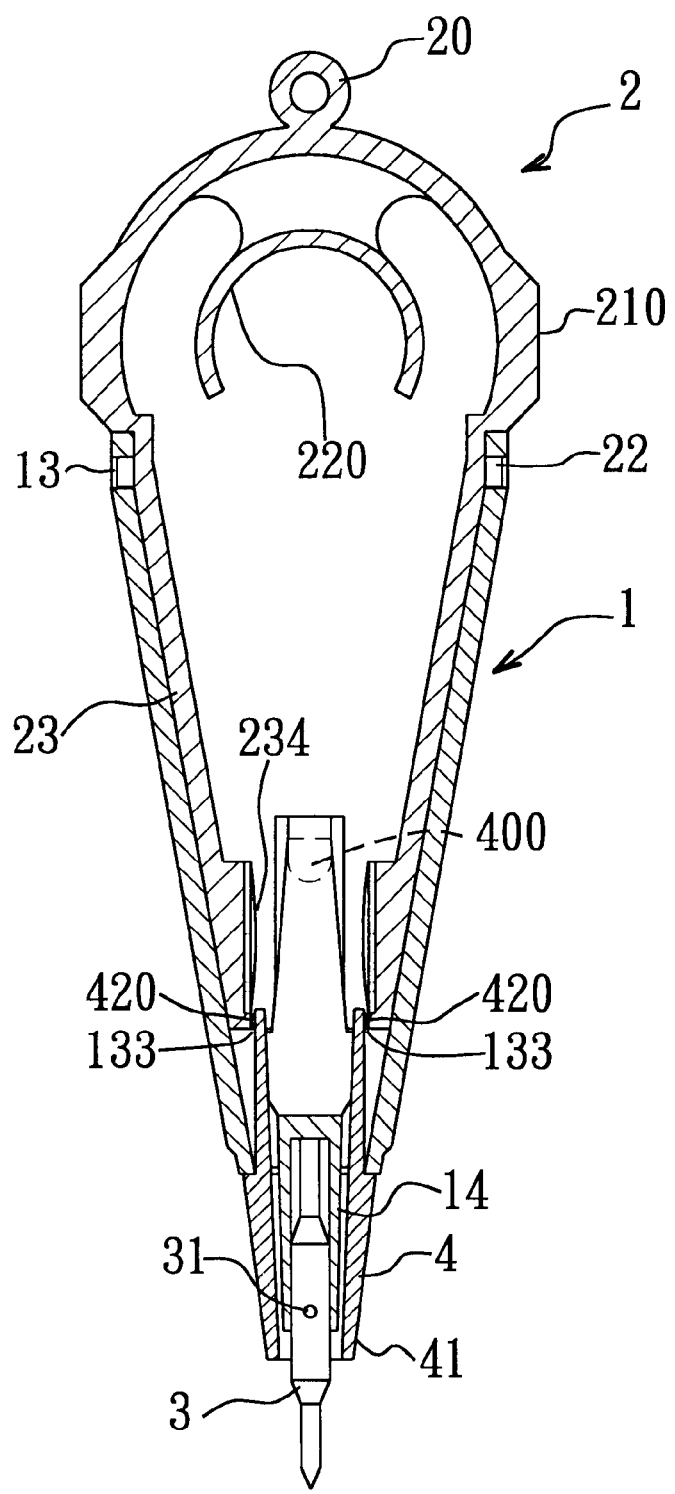
FIG. 12 is a sectional schematic view of the first preferred embodiment in a state of use.

Referring to FIGS. 10 to 12, the cover member 4 is mounted telescopically on the bottom end of the casing body 1 for covering and uncovering the tool bit 3. The cover member 4 includes a sleeve portion 41 that is sleeved around the bit engaging member 14, a pair of opposing slide arms 40 that extend upwardly from the sleeve portion 41 and into the casing body 1 via the slide grooves 120, and a pair of opposing resilient retaining arms 42 that extend upwardly from the sleeve portion 41 and into the casing body 1 via the retaining grooves 122. Each of the slide arms 40 is formed with a key projection 400 that extends into a respective one of the keyways 15 to guide sliding movement of the cover member 4 relative to the casing body 1. Each of the retaining arms 42 is formed with a tab projection 420 that slides past a respective one of the shoulders 133 to retain releasably the cover member 4 in a retracted position relative to the casing body 1 for uncovering the tool bit 3, as shown in FIG. 10, such that the tool bit 3 is capable of maintaining desired eyeglasses.

Figure 13:
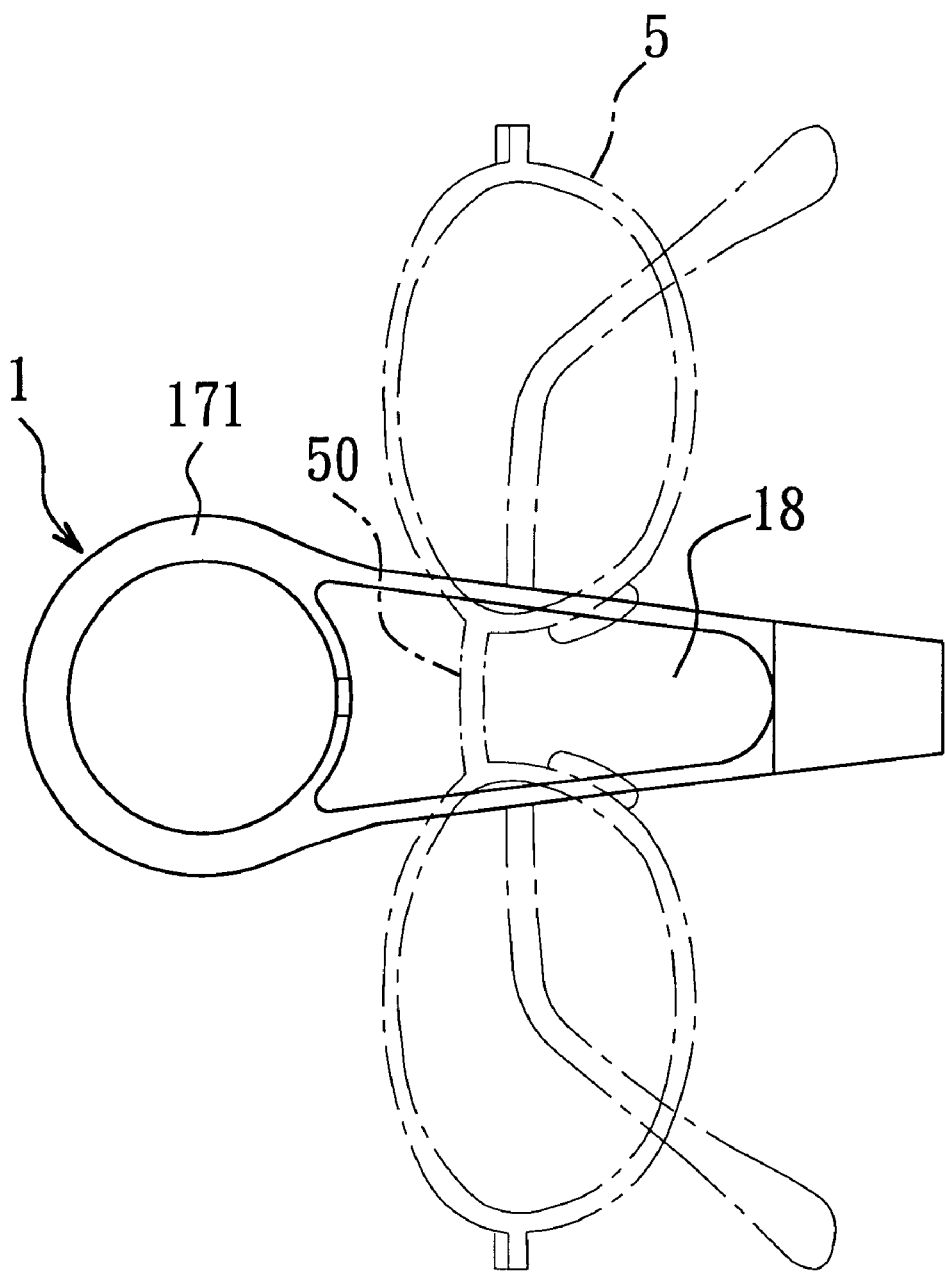
FIG. 13 is a schematic view of the second preferred embodiment of an eyeglasses maintenance kit according to this invention in a state of use.

FIG. 13 illustrates the second preferred embodiment of an eyeglasses maintenance kit according to this invention, which is a modification of the first preferred embodiment. Unlike the previous embodiment, the casing body 1 further has a nose bridge clamp 18 formed on a rear outer wall surface 171 thereof and adapted to clamp a nose bridge portion 50 of a pair of eyeglasses 5.

It is noted that the eyeglasses maintenance kit of this invention is portable and facilitates maintenance and cleaning of eyeglasses. The object of the invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An eyeglasses maintenance kit, comprising:
   a hollow casing body having an open top end and a bottom end opposite to said top end, and including upright front and rear walls and opposite lateral walls that interconnect said front and rear walls, said bottom end of said casing body being formed with a bit engaging member;
   a pincer mounted removably in said casing body via said open top end of said casing body, and including a pair of resilient clamping arms with upper and lower end portions, and a bridging portion that interconnects said upper end portions of said clamping arms; and
   a screw driving tool bit mounted to said bit engaging member.

2. The eyeglasses maintenance kit of claim 1, wherein each of said lateral walls of said casing body is formed with a notch that extends to said open top end of said casing body, said bridging portion of said pincer being provided with a pair of grip projections that are seated respectively in said notches of said casing body when said pincer is mounted in said casing body.

3. The eyeglasses maintenance kit of claim 1, wherein one of said pair of said clamping arms and said casing body is formed with a pair of positioning projections, and the other one of said pair of clamping arms and said casing body is formed with a pair of positioning holes for engaging removably said positioning projections when said pincer is mounted in said casing body.

4. The eyeglasses maintenance kit of claim 1, wherein said bridging portion extends outwardly of said open top end of said casing body when said pincer is mounted in said casing body, and is formed with an eyelet.

5. The eyeglasses maintenance kit of claim 1, wherein said clamping arms are in sliding contact with an inner wall surface of said casing body when said pincer is mounted in said casing body.

6. The eyeglasses maintenance kit of claim 1, wherein said lower end portion of at least one of said clamping arms has a lens rubbing pad mounted thereon.

7. The eyeglasses maintenance kit of claim 1, wherein said bridge portion is formed with a cloth retaining member that extends between said clamping arms and that is adapted to retain removably a lens wiping cloth between said clamping arms.

8. The eyeglasses maintenance kit of claim 7, wherein said pincer further includes a cover plate that is mounted on one side of said cloth retaining member.

9. The eyeglasses maintenance kit of claim 1, wherein said casing body has a clip formed on an outer wall surface thereof.

10. The eyeglasses maintenance kit of claim 1, wherein said bit engaging member is formed as a tubular member, and said tool bit is mounted removably in said bit engaging member.

11. The eyeglasses maintenance kit of claim 10, wherein said tool bit is provided with a spring-loaded retainer for retaining removably said tool bit in said bit engaging member.

12. The eyeglasses maintenance kit of claim 10, wherein said tool bit has a first end portion formed as a flat tip, and a second end portion formed as a cross-tip.

13. The eyeglasses maintenance kit of claim 12, wherein said tool bit has an axial length longer than that of said bit engaging member.

14. The eyeglasses maintenance kit of claim 10, further comprising a cover member mounted telescopically on said bottom end of said casing body for covering and uncovering said tool bit.

15. The eyeglasses maintenance kit of claim 14, wherein said bit engaging member extends into said casing body and cooperates with said front, rear and lateral walls to form a pair of opposing slide grooves and a pair of opposing retaining grooves.

16. The eyeglasses maintenance kit of claim 15, wherein said cover member includes a sleeve portion that is sleeved around said bit engaging member, a pair of opposing slide arms that extend upwardly from said sleeve portion and into said casing body via said slide grooves, and a pair of opposing resilient retaining arms that extend upwardly from said sleeve portion and into said casing body via said retaining grooves.

17. The eyeglasses maintenance kit of claim 16, wherein said casing body has opposite inner wall surfaces formed with a pair of confronting vertical keyways, each of said slide arms being formed with a key projection that extends into a respective one of said keyways to guide sliding movement of said cover member relative to said casing body.

18. The eyeglasses maintenance kit of claim 16, wherein said casing body has opposite inner wall surfaces formed with a pair of confronting radial inward shoulders, each of said retaining arms being formed with a tab projection that slides past a respective one of said shoulders to retain releasably said cover member in a retracted position relative to said casing body for uncovering said tool bit.

19. The eyeglasses maintenance kit of claim 1, wherein said casing body further has a nose bridge clamp formed on an outer wall surface thereof and adapted to clamp a nose bridge portion of a pair of eyeglasses.

\* \* \* \* \*